United States Patent
Loeffelholz

(10) Patent No.: US 9,557,498 B2
(45) Date of Patent: Jan. 31, 2017

(54) DUST CAPS HAVING CODING SYSTEM FOR FACILITATING INSTALLING A FIBER OPTIC NETWORK

(71) Applicant: ADC Telecommunications, Inc., Berwyn, PA (US)

(72) Inventor: Todd Loeffelholz, Minnetonka, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/755,380

(22) Filed: Jun. 30, 2015

(65) Prior Publication Data

US 2016/0178857 A1    Jun. 23, 2016

Related U.S. Application Data

(60) Provisional application No. 62/094,424, filed on Dec. 19, 2014.

(51) Int. Cl.
  *G02B 6/00* (2006.01)
  *G02B 6/38* (2006.01)
  *G02B 6/44* (2006.01)

(52) U.S. Cl.
  CPC ........... *G02B 6/3895* (2013.01); *G02B 6/3849* (2013.01); *G02B 6/3897* (2013.01); *G02B 6/4472* (2013.01); *G02B 6/387* (2013.01); *G02B 6/3885* (2013.01)

(58) Field of Classification Search
  CPC ..... H04L 67/104; H04W 88/06; H04W 28/04; G02B 6/3849; G02B 6/3831; G02B 6/3825; G02B 6/3879; G06K 19/07732

USPC ........ 385/56, 88–99, 134–137, 147, 31, 33, 385/39, 47, 53, 140, 144
  See application file for complete search history.

(56) References Cited

U.S. PATENT DOCUMENTS

| | | | | |
|---|---|---|---|---|
| 4,598,581 A | * | 7/1986 | Brekke | G01L 19/0007 374/145 |
| 4,682,848 A | * | 7/1987 | Cairns | G02B 6/3816 385/69 |
| 4,887,883 A | * | 12/1989 | Darbut | G02B 6/3816 385/58 |
| 5,222,166 A | * | 6/1993 | Weltha | H04Q 11/0062 385/16 |
| 5,408,313 A | * | 4/1995 | Ponstingl | G01N 21/8507 356/246 |
| 5,945,633 A | | 8/1999 | Ott et al. | |
| 6,105,096 A | * | 8/2000 | Martinelli | H04B 10/2503 709/250 |

(Continued)

FOREIGN PATENT DOCUMENTS

| | | |
|---|---|---|
| EP | 1981185 A1 | 10/2008 |
| JP | H10-32545 | 2/1998 |

(Continued)

*Primary Examiner* — Akm Enayet Ullah
(74) *Attorney, Agent, or Firm* — Merchant & Gould P.C.

(57) ABSTRACT

The present disclosure relates to a fiber optic network including first and second optical components desired to be optically coupled together, and third and fourth optical components desired to be couple together. The first and second optical components include first and second de-mateable connection locations having dust caps with first coordinated indicia. The third and fourth optical components include third and fourth de-mateable connection locations having dust caps with second coordinated indicia.

23 Claims, 12 Drawing Sheets

(56) References Cited

U.S. PATENT DOCUMENTS

| | | | |
|---|---|---|---|
| 6,227,717 B1* | 5/2001 | Ott | G02B 6/3849 385/134 |
| 6,366,556 B1* | 4/2002 | Ballintine | H04J 3/085 370/216 |
| 6,547,450 B2 | 4/2003 | Lampert | |
| 6,778,752 B2 | 8/2004 | Laporte et al. | |
| 7,073,953 B2* | 7/2006 | Roth | G02B 6/3821 385/53 |
| 7,088,893 B2 | 8/2006 | Cooke et al. | |
| 7,277,614 B2 | 10/2007 | Cody et al. | |
| 7,390,203 B2 | 6/2008 | Murano et al. | |
| 7,489,849 B2 | 2/2009 | Reagan et al. | |
| 7,572,066 B2* | 8/2009 | de Jong | G02B 6/3849 385/39 |
| 7,744,286 B2* | 6/2010 | Lu | G02B 6/3816 385/53 |
| 7,770,657 B2 | 8/2010 | Poutre | |
| 7,787,737 B2 | 8/2010 | Cooke et al. | |
| 7,850,370 B2 | 12/2010 | Murano | |
| 8,167,504 B2 | 5/2012 | Allen et al. | |
| 9,207,421 B2 | 12/2015 | Conner | |
| 9,261,654 B2 | 2/2016 | Murphy et al. | |
| 2004/0095829 A1* | 5/2004 | Barnbrook | G06K 19/07732 365/222 |
| 2007/0053513 A1* | 3/2007 | Hoffberg | G06K 9/00369 380/201 |
| 2008/0013175 A1* | 1/2008 | Laganas | G03B 17/561 359/503 |
| 2008/0273840 A1* | 11/2008 | Lu | G02B 6/3831 385/72 |
| 2009/0003772 A1* | 1/2009 | Lu | G02B 6/3825 385/60 |
| 2010/0303408 A1* | 12/2010 | Conner | G02B 6/4475 385/24 |
| 2010/0322580 A1 | 12/2010 | Beamon et al. | |
| 2011/0091166 A1 | 4/2011 | Benjamin et al. | |
| 2011/0158598 A1* | 6/2011 | LeBlanc | G02B 6/4466 385/135 |
| 2011/0293277 A1* | 12/2011 | Bradea | H04J 14/0282 398/66 |
| 2015/0016788 A1* | 1/2015 | Buff | G02B 6/4472 385/100 |
| 2015/0378112 A1* | 12/2015 | Marcouiller | G02B 6/3879 385/56 |
| 2016/0097909 A1* | 4/2016 | Loeffelholz | G02B 6/46 385/134 |
| 2016/0124173 A1* | 5/2016 | Kowalczyk | G02B 6/3849 385/78 |

FOREIGN PATENT DOCUMENTS

| | | |
|---|---|---|
| WO | 2007106477 A2 | 9/2007 |
| WO | 2013149150 A1 | 10/2013 |
| WO | 2014190281 A1 | 11/2014 |

* cited by examiner

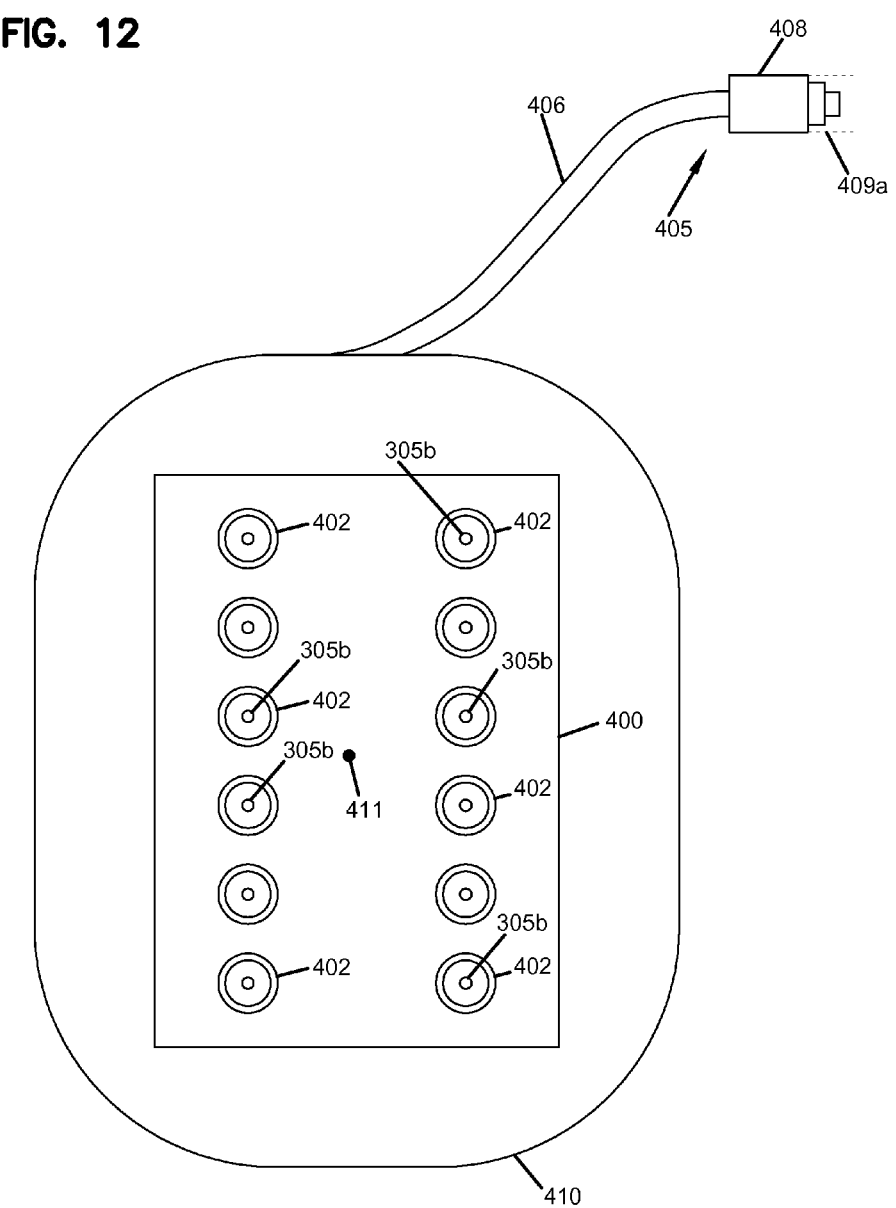

DUST CAPS HAVING CODING SYSTEM FOR FACILITATING INSTALLING A FIBER OPTIC NETWORK

CROSS REFERENCE TO RELATED APPLICATIONS

This application claims the benefit of U.S. Provisional Application No. 62/094,424, filed Dec. 19, 2014, and titled "Coding System for Facilitating installing a Fiber Optic Network," the disclosure of which is hereby incorporated herein by reference.

TECHNICAL FIELD

The present disclosure relates generally to equipment for fiber optic communications networks. More particularly, the present disclosure relates to the components of passive optical networks and methods for deploying the same.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

SUMMARY

Aspects of the present disclosure relate to coding systems that facilitate efficiently and effectively deploying a fiber optic network. In certain examples, the coding system can include coded dust caps for optical components. The coded dust caps can include dust caps provided on fiber optic connectors terminating fiber optic cables. The coded dust caps can also include dust caps secured within fiber optic adapters suited for receiving fiber optic connectors. In certain examples, the fiber optic connectors and fiber optic adapters can include hardened/ruggedized and sealed constructions for outdoor environmental use. In certain examples, the connectors, adapters, and dust caps can include twist-to-lock interfaces. In certain examples, the dust caps can include identifying indicia such as identifying colors, identifying markings, identifying shapes, identifying letters, identifying symbols, identifying numbers or the like. In certain examples, the identifying indicia can be coordinated between optical components intended to be coupled together so that an installer in the field can readily recognize and identify which components should be coupled together.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the specification, illustrate several aspects of the present disclosure and together with the description, serve to explain the principles of the disclosure. A brief description of the drawings is as follows:

FIG. 12 is a schematic depiction of a drop terminal that may be incorporated into architectures in accordance with the principles of the present disclosure.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
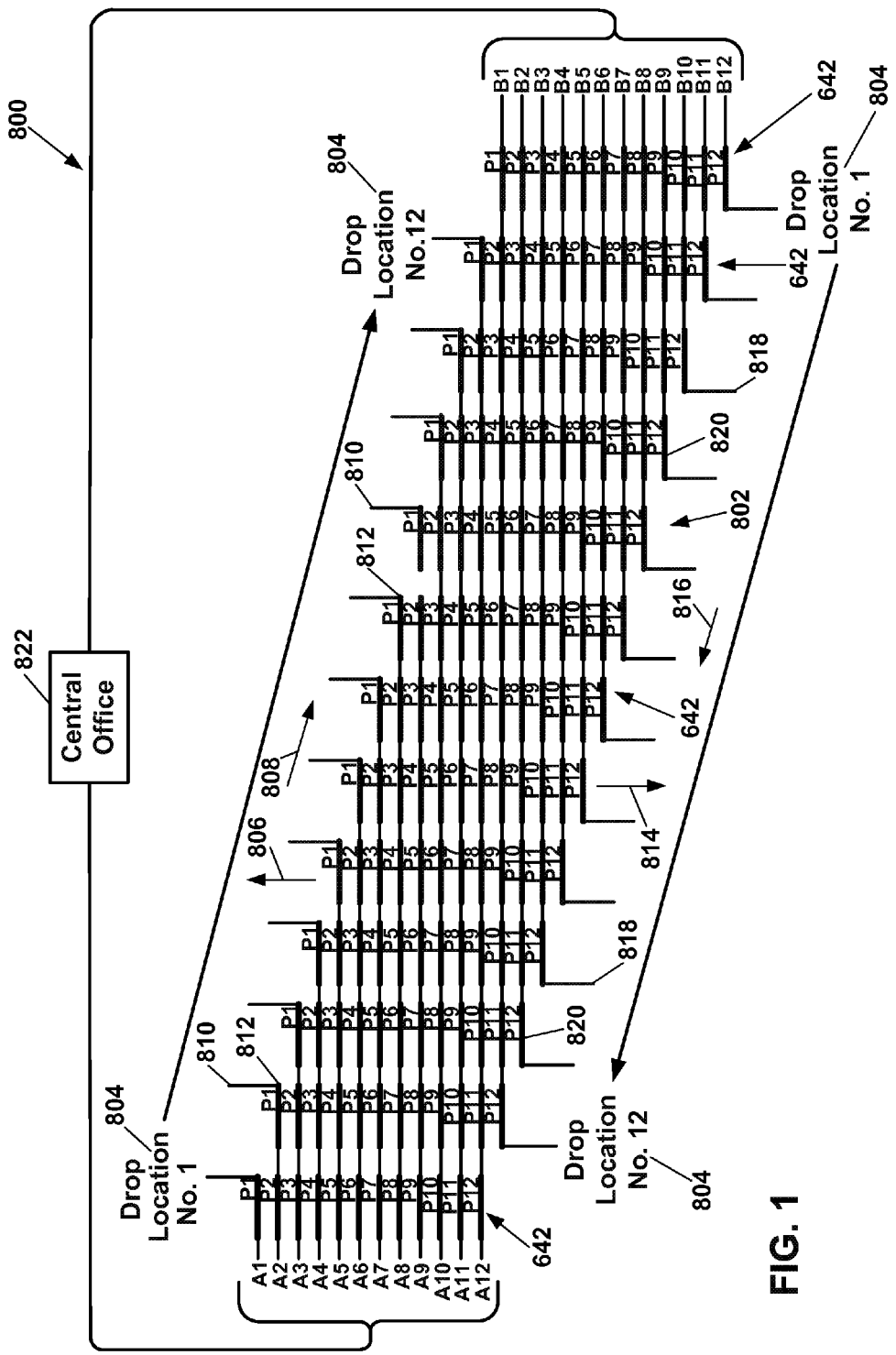
FIG. 1 is a schematic of a fiber distribution line where signal travel is bi-directional used in systems in accordance with the principles of the present disclosure.

FIG. 1 illustrates a fiber optic network 800 that incorporates an example bidirectional indexing architecture 800 that can be efficiently deployed using indexing terminals in accordance with the principles of the present disclosure. The bidirectional architecture assists in maximizing the capacity of the network and/or for providing redundant lines to given drop locations.

Referring to FIG. 1, the fiber optic network architecture 800 includes first fiber optic lines A1-A12 and second fiber optic lines B1-B12 routed at least partially along a route 802 that extends past a plurality of drop locations 804. The fiber optic network architecture 800 also includes a plurality of multi-fiber optical connectors 642 (e.g., HMFOC connectors) positioned along the route 802. The fiber optic lines A1-A12 and B1-B12 extend through the multi-fiber optical connectors 642. The multi-fiber optical connectors 642 each have a plurality of consecutive fiber positions P1-P12 for receiving optical fibers corresponding to the fiber optic lines A1-A12 and B1-B12.

The fiber optic lines A1-A12 are indexed in a first indexing direction 806 along the consecutive fiber positions P1-P12 of the multi-fiber optical connectors 642 as the fiber optic lines A1-A12 extend in a first route direction 808 along the route 802. The fiber optic lines A1-A12 are progressively dropped from the route 802 to subscriber connection points 810 at the drop locations 804 by progressively indexing the fiber optic lines A1-A12 to one of the consecutive fiber positions P1-P12 that is a first predetermined drop position 812 (e.g., P1).

The fiber optic lines B1-B12 are indexed in a second indexing direction 814 along the consecutive fiber positions P1-P12 as the fiber optic lines B1-B12 extend in a second route direction 816 along the route 802. The optical fiber lines B1-B12 are progressively dropped from the route 802 to subscriber connection points 818 at the drop locations 804 by progressively indexing the fiber optic lines to another of the consecutive fiber positions P1-P12 that is a second predetermined drop position 820 (e.g., P12). The second predetermined drop position 820 is a different one of the consecutive fiber positions P1-P12 as compared to the first predetermined drop position 812. Also, the first indexing direction 806 is opposite from the second indexing direction 814. Moreover, the first route direction 808 is opposite from the second route direction 816.

It will be appreciated that the architecture 800 is depicted schematically and that additional multi-fiber optical connectors (e.g., HMFOC connectors) can be added into the architecture 800. Additionally, single fiber optical ports such as ruggedized fiber optic adapters can be provided at the subscriber connection points 810, 818. Moreover, various indexing terminals can be strung serially together in a daisy chain to form the architecture 800.

In the depicted embodiment, the multi-fiber optical connectors 642 are 12-fiber optical connectors. In other examples, the multi-fiber optical connectors 642 can include at least 4, 6, 8, 12, 24 or more optical fibers.

Referring back to FIG. 1, the first optical lines A1-A12 and the second optical lines B1-B12 extend to a common location such as a central office 822. In this way, the optical fiber lines A1-A12 and the optical fiber lines B1-B12 cooperate to form a fiber loop.

As the terms are used herein, ruggedized optical connectors and ruggedized optical adapters are configured to mate together to form an environmental seal. Some non-limiting example ruggedized optical connector interfaces suitable for use with an indexing terminal are disclosed in U.S. Pat. Nos. 7,744,288, 7,762,726, 7,744,286, 7,942,590, and 7,959,361, the disclosures of which are hereby incorporated herein by reference.

Figure 4:
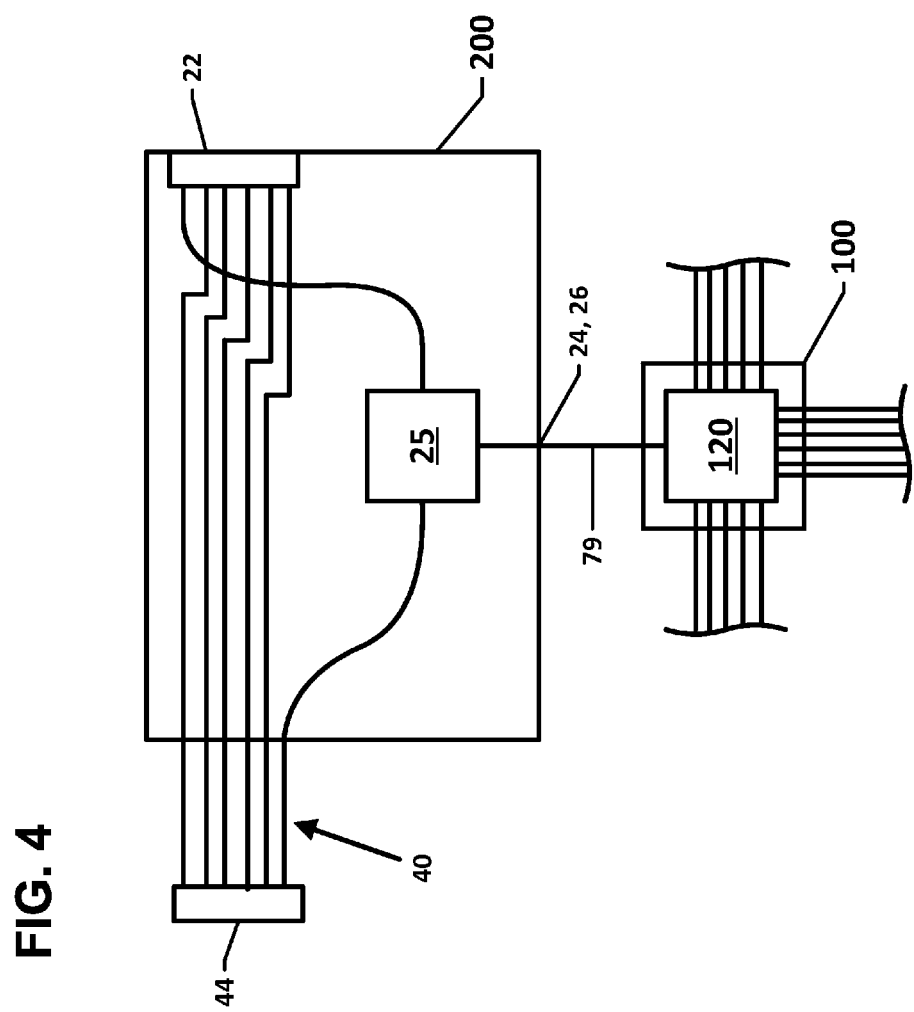
FIG. 4 is a schematic of an indexing terminal having a splitter that combines optical signals from different indexing directions and outputs the signals to an output of the indexing terminal.

The terminals can include hardened/ruggedized multi-fiber optical connectors (HMFOC). HMFOC's can include environmental seals for sealing the connectors in outside environments. HMFOC's can include fasteners such as threaded or bayonet-style fasteners for providing robust connector-to connector mechanical connections. HMFOC's can include male connectors on cables, female connectors on cables, ports/adapters on housings and other structures. HMFOC's can include multi-fiber ferrules including fiber receiving arrangements defining a plurality of fiber receiving positions. In certain examples, the fiber receiving positions can be arranged in one or more rows of fiber receiving positions. FIG. 4 shows example mating male and female HMFOC connectors 600a, 600b. The male and female connectors 600a, 600b include intermatable mechanical coupling interfaces. For example, the male connector 600a includes an internally threaded nut 602a that threads on a threaded portion 602b of the female connector 600b. Also, the male connector 600a includes a plug portion 604 with openings 606, 608 that mate with projections 610, 611 of the female connector 600b to provide alignment during coupling. The connectors 600a, 600b include ferrules 614a, 614b having fiber receiving arrangements that include fiber receiving positions 616 (e.g., a row of twelve fiber receiving positions) that align when the connectors 600a, 600b are mated to provide optical connections between the optical fiber supported by the ferrules 614a, 614b. Further details of example HMFOC connectors are disclosed at U.S. Pat. No. 7,264,402, which is hereby incorporated by reference in its entirety.

The terminals can also include hardened single fiber connectors (DLX). Hardened single fiber connectors can include environmental seals for sealing the connectors in outside environments. Hardened single fiber connectors can include fasteners such as threaded fasteners for providing robust connector-to connector mechanical connections. Hardened single fiber connectors can include male connectors on cables, female connectors on cables, ports/adapters on housings and other structures. Hardened single fiber connectors can include ferrules supporting single fibers. Further details about example hardened single fiber connectors and adapters are disclosed at U.S. Pat. No. 7,959,361, which is hereby incorporated by reference in its entirety.

The terminals can also include non-ruggedized connectors such as standard single fiber connectors (e.g., SC plugs, SC adapters, LC plugs, LC adapters, ST plugs, ST adapters, etc.) or standard multi-fiber connectors (e.g., MPO plugs and/or MPO adapters).

Figure 2:
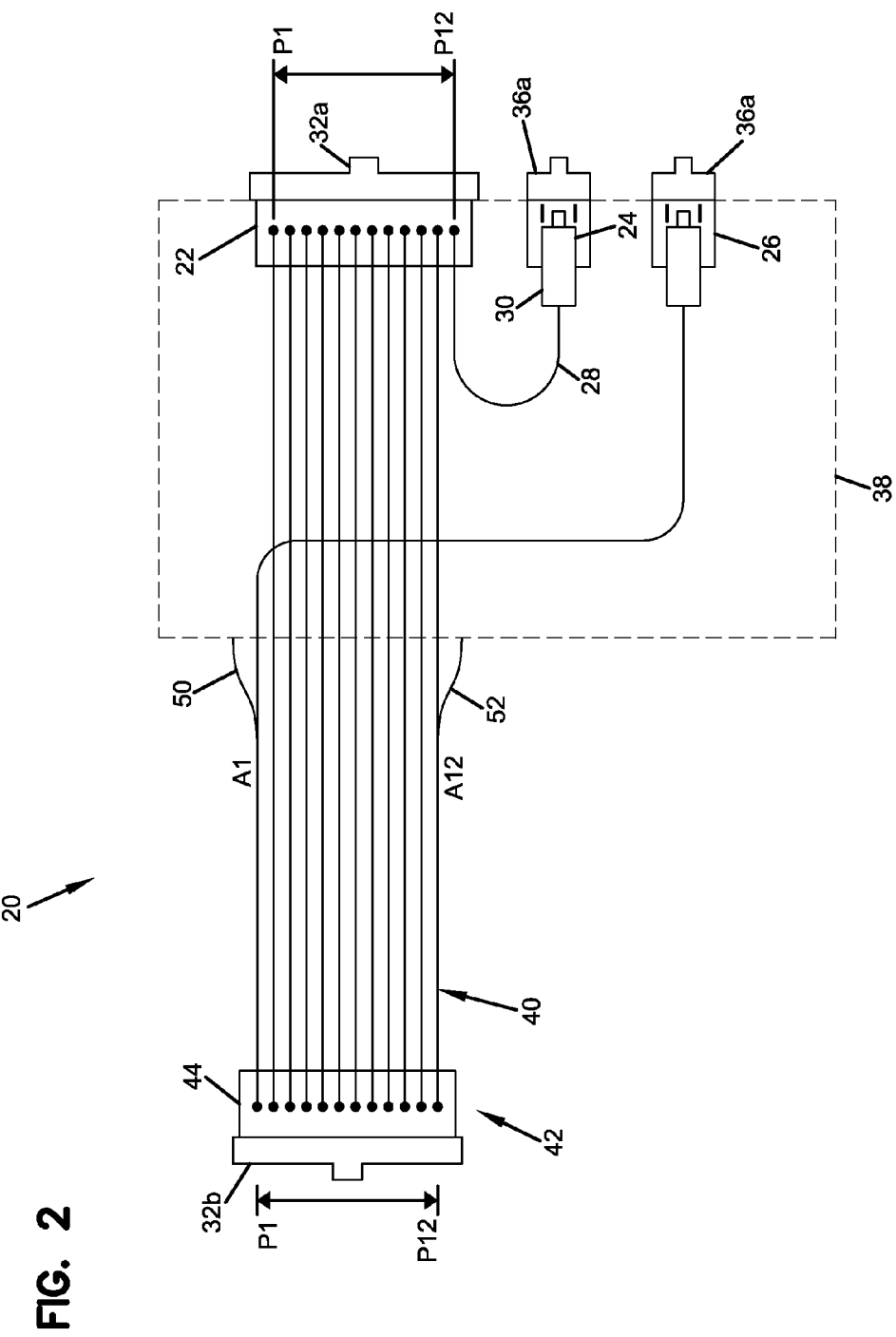
FIG. 2 is a schematic of an indexing terminal in accordance with the principles of the present disclosure.

FIG. 2 illustrates an indexing terminal 20 in accordance with the principles of the present disclosure suitable for supporting a bidirectional indexing architecture such as the bidirectional indexing architecture shown at FIG. 1. The indexing terminal 20 includes a multi-fiber ruggedized de-mateable connection location 22, a first single-fiber ruggedized de-mateable connection location 24 and a second single-fiber ruggedized de-mateable connection location 26. The multi-fiber ruggedized de-mateable connection location 22 includes a plurality of fiber positions labeled P1-P12. One of the fiber positions P1-P12 is coupled to the first single-fiber ruggedized de-mateable connection location 24. For example, as shown at FIG. 2, the fiber position P12 is optically connected to the first single-fiber ruggedized de-mateable connection location 24 by an optical pigtail 28 terminated by a non-ruggedized fiber optic connector 30 that connects to the first single-fiber ruggedized de-mateable connection location 24.

Figure 5:
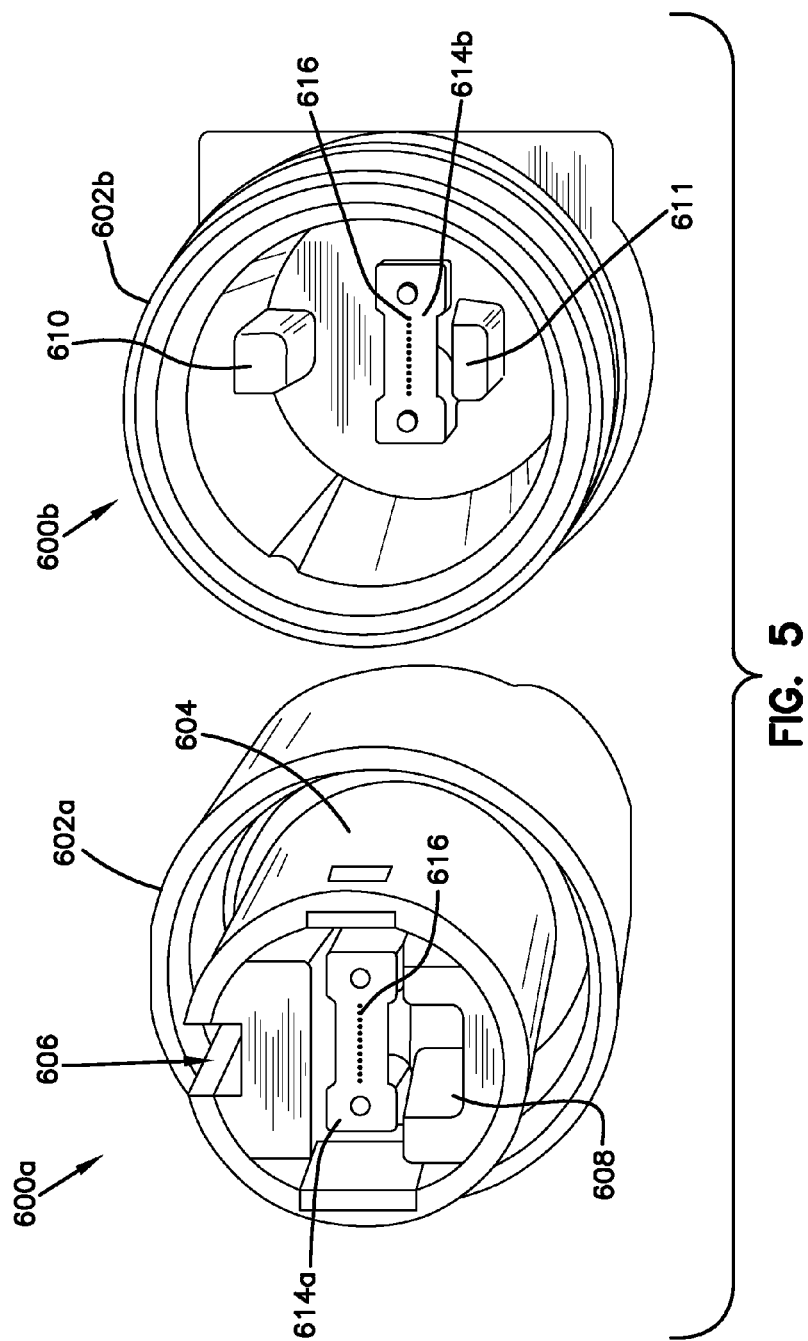
FIG. 5 is a perspective view of ruggedized multi-fiber connectors that can be used in systems and components of the present disclosure.
Figure 6:
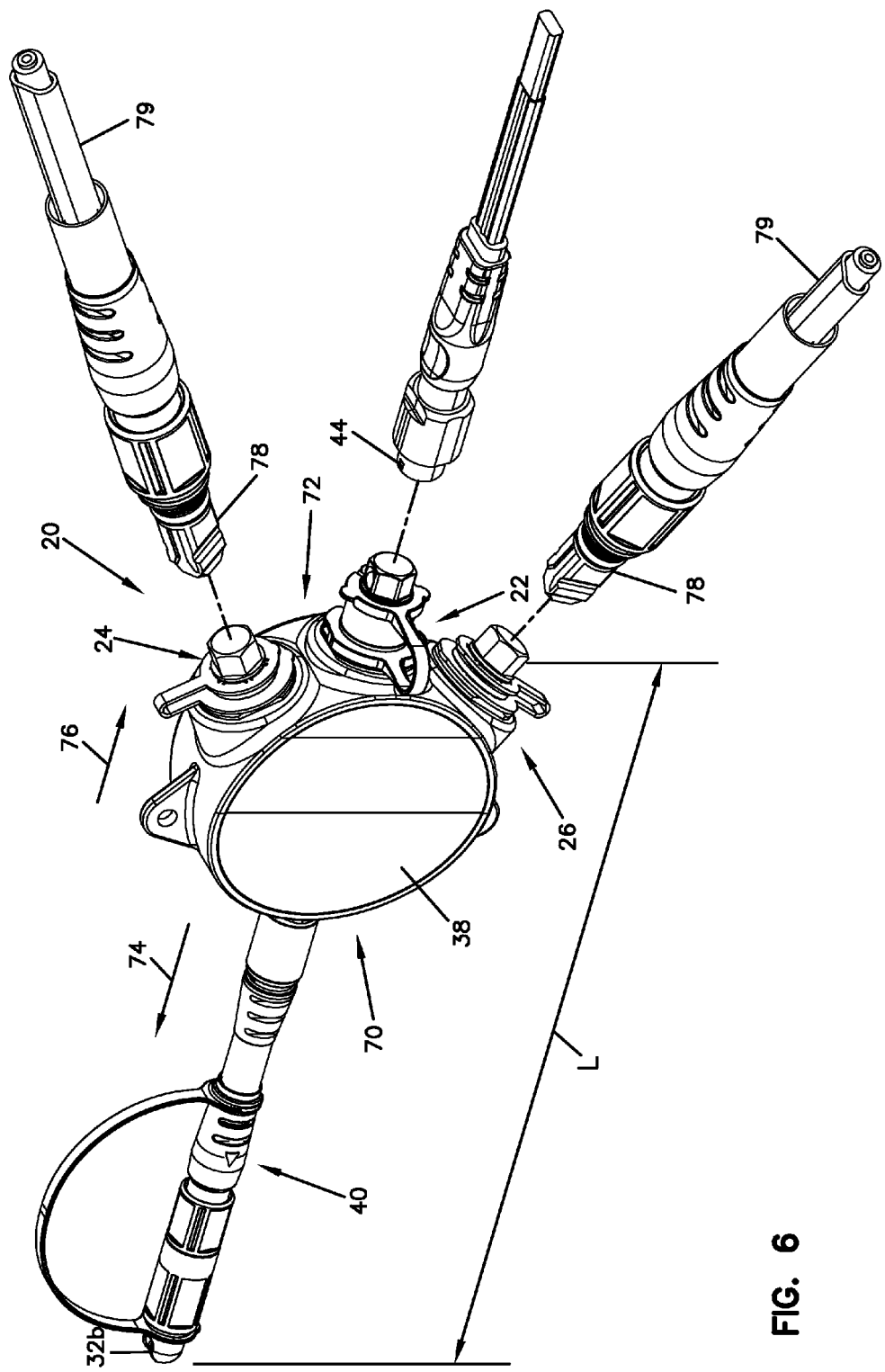
FIG. 6 is a first side perspective view of an indexing terminal housing with the dust caps removed from the corresponding cables, which are shown offset from the indexing terminal housing.
Figure 7:
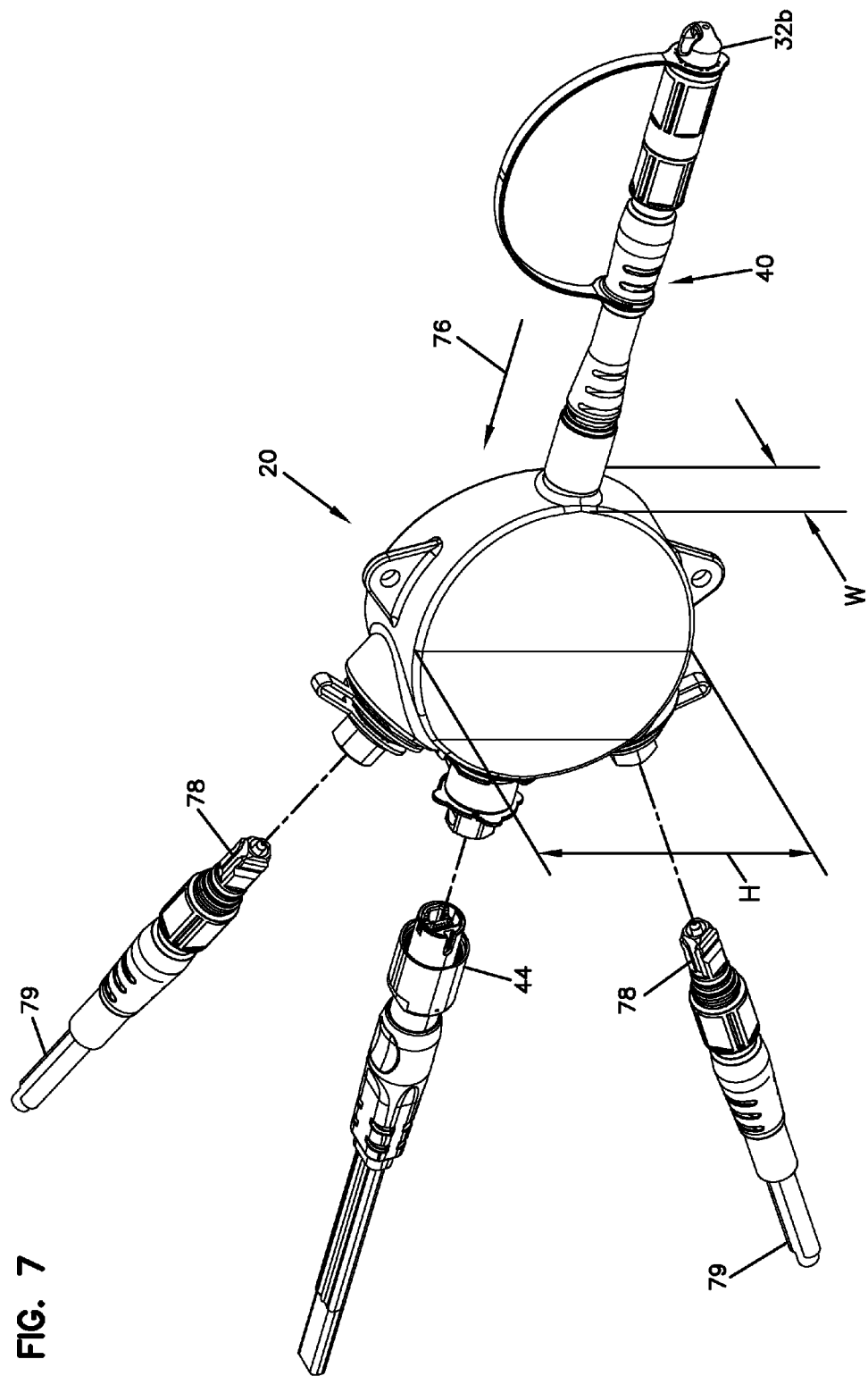
FIG. 7 is a second side perspective view of FIG. 6.
Figure 8:
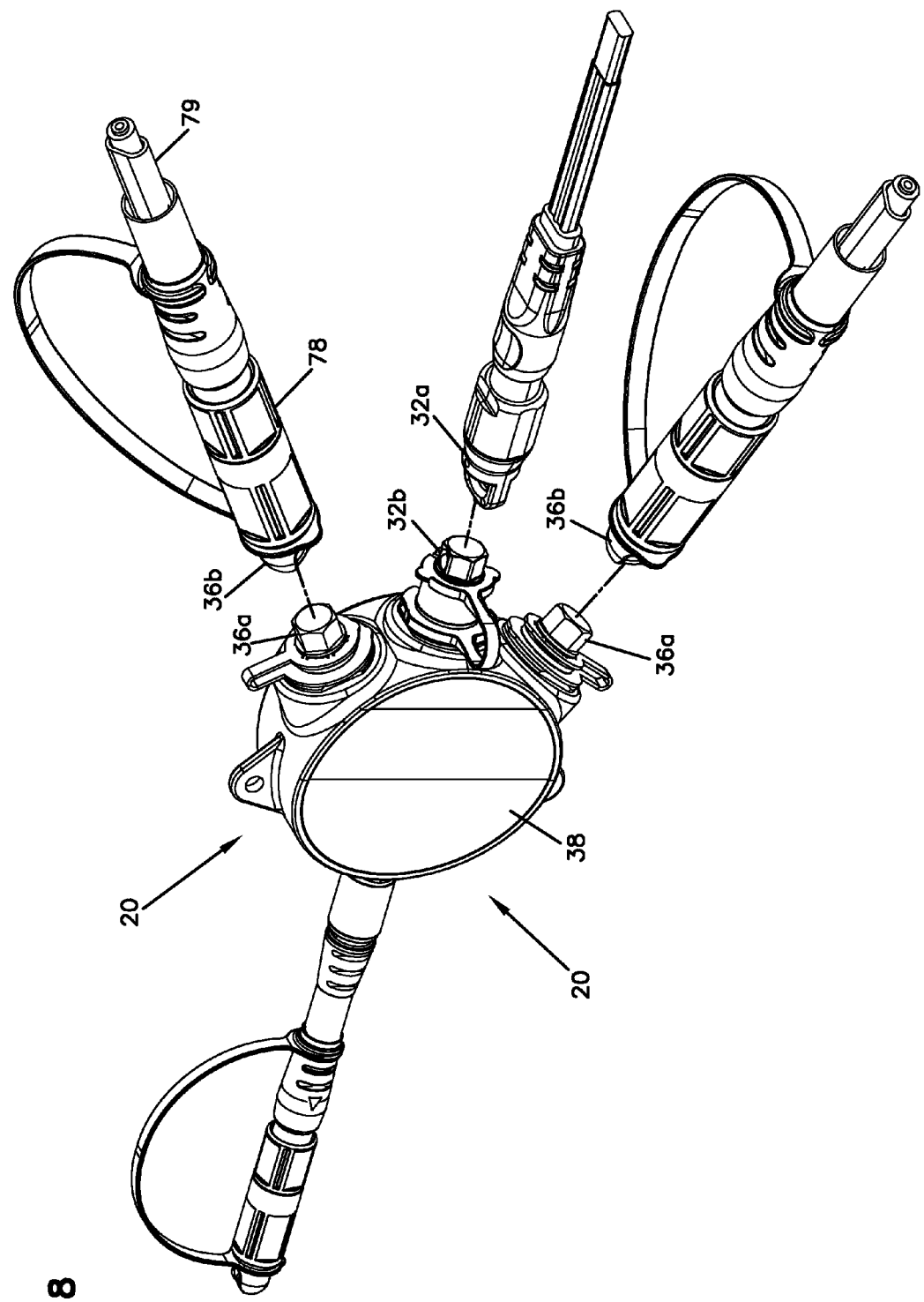
FIG. 8 is a first side perspective view of the indexing terminal housing of FIG. 6 except that the dust caps are disposed on the corresponding cables.
Figure 9:
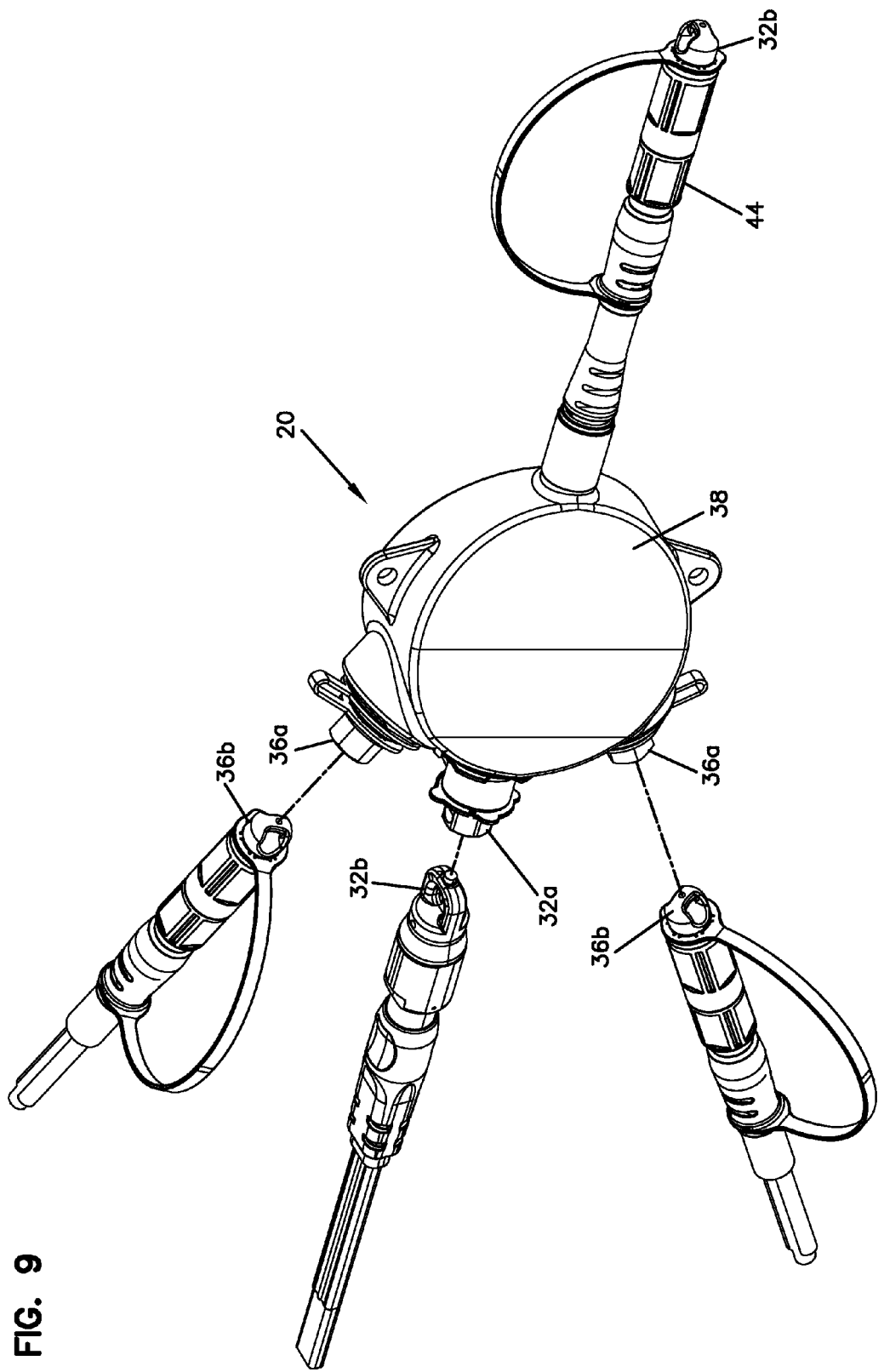
FIG. 9 is a second side perspective view of FIG. 8.
Figure 10:
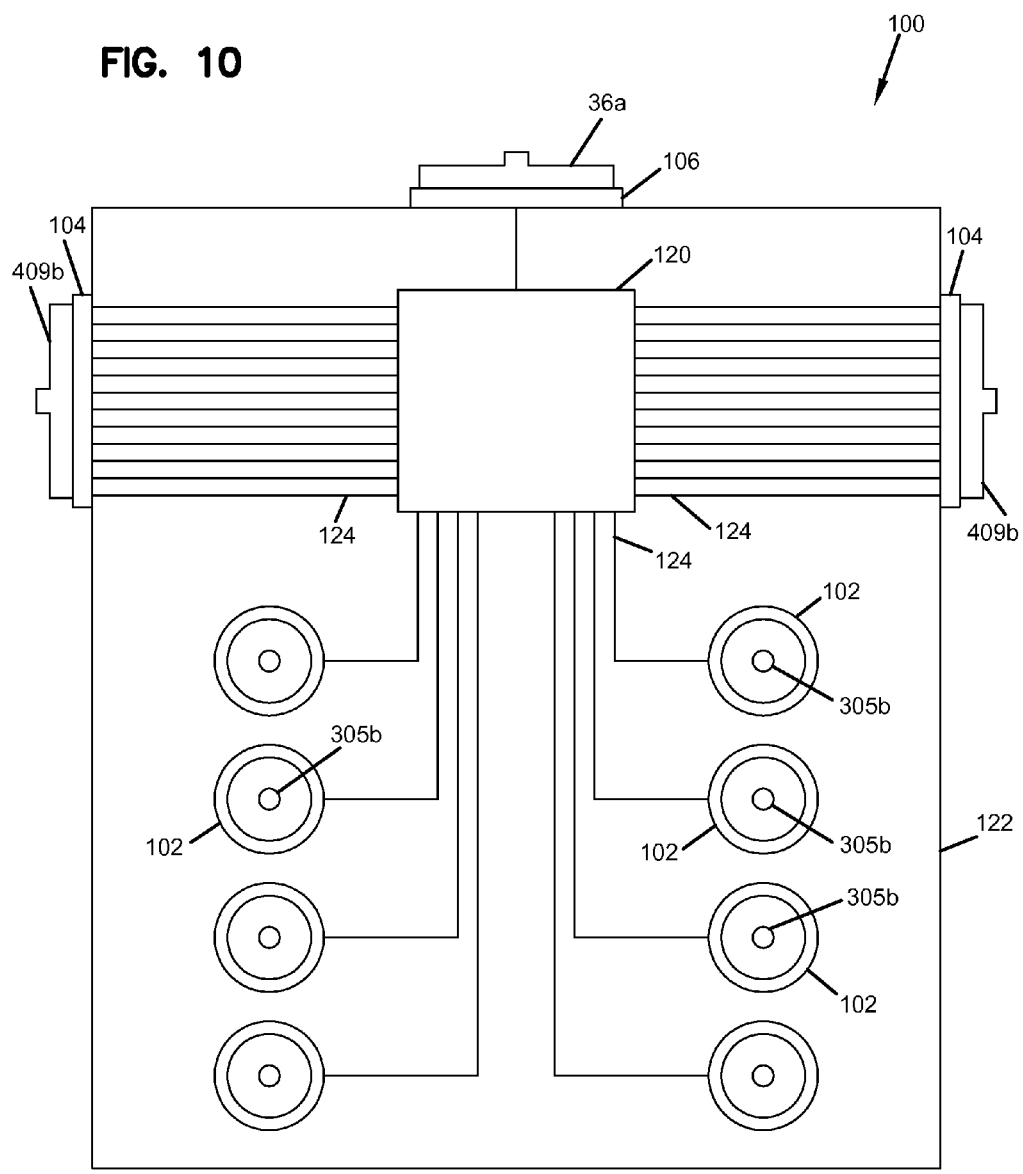
FIG. 10 is a schematic depiction of a splitter terminal that may be incorporated into architectures in accordance with the principles of the present disclosure.

In certain examples, the multi-fiber ruggedized de-mateable connection location 22 is an HMFOC adapter of the type disclosed at U.S. Pat. No. 7,264,402. A dust cap 32a can be used to close an exterior port of the multi-fiber ruggedized de-mateable connection location 22 when a corresponding multi-fiber ruggedized connector is not received therein. The first and second single-fiber ruggedized de-mateable connection locations 24, 26 can be defined by ruggedized, single-fiber adapters of the type disclosed at U.S. Pat. No. 7,959,361. Dust caps 36a can be used to enclose exterior ports of the first and second single-fiber ruggedized de-mateable connection locations 24, 26 when corresponding ruggedized single-fiber connectors (e.g., ruggedized single-fiber connectors 78, shown at FIGS. 5 and 6, having dust caps 36b) are not received therein. The dust caps 36a, 36b can have coordinated/matching indicia. The connectors 78 can terminate the ends of fiber optic cables 79 (see FIGS. 3 and 5-10). In certain examples, the indexing terminal 20 can include a housing 38 on which the multi-fiber ruggedized de-mateable connection location 22, the first single-fiber ruggedized de-mateable connection location 24 and the second single-fiber ruggedized de-mateable connection location 26 are provided. In certain examples, the housing 38 can have a polymeric (e.g., plastic) construction that is relatively rigid in nature. In certain examples, housing 38 can be environmentally sealed and suitable for outdoor use.

Referring still to FIG. 2, the indexing terminal 20 further includes a tether 40 having a first end 42 terminated by a ruggedized multi-fiber optical connector 44 (e.g., an HMFOC connector). The ruggedized multi-fiber optical connector 44 has a plurality of fiber positions labeled P1-P12. One of the fiber positions is optically coupled to the second single-fiber ruggedized de-mateable connection location 26. Others of the fiber positions P1-P12 of the ruggedized multi-fiber optical connector 44 are optically coupled to the multi-fiber ruggedized de-mateable connection location 22. The plurality of fiber lines A1-A12 are provided for making such optical connections. For example, in the depicted embodiment, fiber line A1 optically connects position P1 of the ruggedized multi-fiber optical connector 44 to the second single-fiber ruggedized de-mateable connection location 26. In one example, the fiber line A1 can be a connectorized pigtail having an end terminated by a non-ruggedized fiber optic connector 46 (e.g., an SC-type connector) that is inserted into an interior port of the second non-fiber ruggedized de-mateable connection location 26. The fiber lines A2-A12 are shown optically connecting the ruggedized multi-fiber optical connector 44 to the multi-fiber ruggedized de-mateable connection location 22. The fiber lines A2-A12 are indexed such that the fiber lines A2-A12 are connected to different fiber positions at the ruggedized multi-fiber optical connector 44 as compared to at the multi-fiber ruggedized de-mateable connection location 22. For example, the fiber lines A2-A12 are shown indexed one position so as to be respectively coupled to positions P1-P11 of the multi-fiber ruggedized de-mateable connection location 22.

In certain examples, the ruggedized multi-fiber optical connector 44 includes a dust cap 32b for protecting a ferrule and/or fiber end faces of the connector 44 when the ruggedized multi-fiber optical connector 44 is de-mated from another connector. The dust caps 32a, 32b can have coordinated/matching indicia.

In certain examples, the tether 40 is a stub cable that interfaces with the housing 38 of the indexing terminal 20 at a pass-through location 50. In certain examples, a boot 52 can be provided at the pass-through location 50 for providing strain relief and other reinforcement to the tether 40. In certain examples, the tether 40 is a relatively short stub that can be less than 2 feet or less than 1 foot in length. In such examples, the indexing terminal 20 can be daisy chained to a leg terminal by a patch cord of extended length having a first ruggedized multi-fiber connector that mates with the ruggedized multi-fiber optical connector 44 and a second ruggedized multi-fiber connector that mates with the multi-fiber ruggedized de-mateable connection location 22 of the like indexing terminal. In other embodiments, the stub cable formed by the tether 40 can be relatively long (e.g., more than 500 feet or more than 1,000 feet in length). In such examples, the indexing terminal 20 can be coupled to a like indexing terminal by directly mating the ruggedized multi-fiber optical connector 44 with the multi-fiber ruggedized de-mateable connection location 22 of the like indexing terminal.

In alternative embodiments, the pass-through location 50 described above can be replaced with a multi-fiber ruggedized de-mateable connection location similar to the multi-fiber ruggedized de-mateable connection location 22. In this type of example, an extended patch cord having opposite ends terminated by ruggedized multi-fiber optical connectors can be used to couple the indexing terminal to a like terminal.

Figure 3:
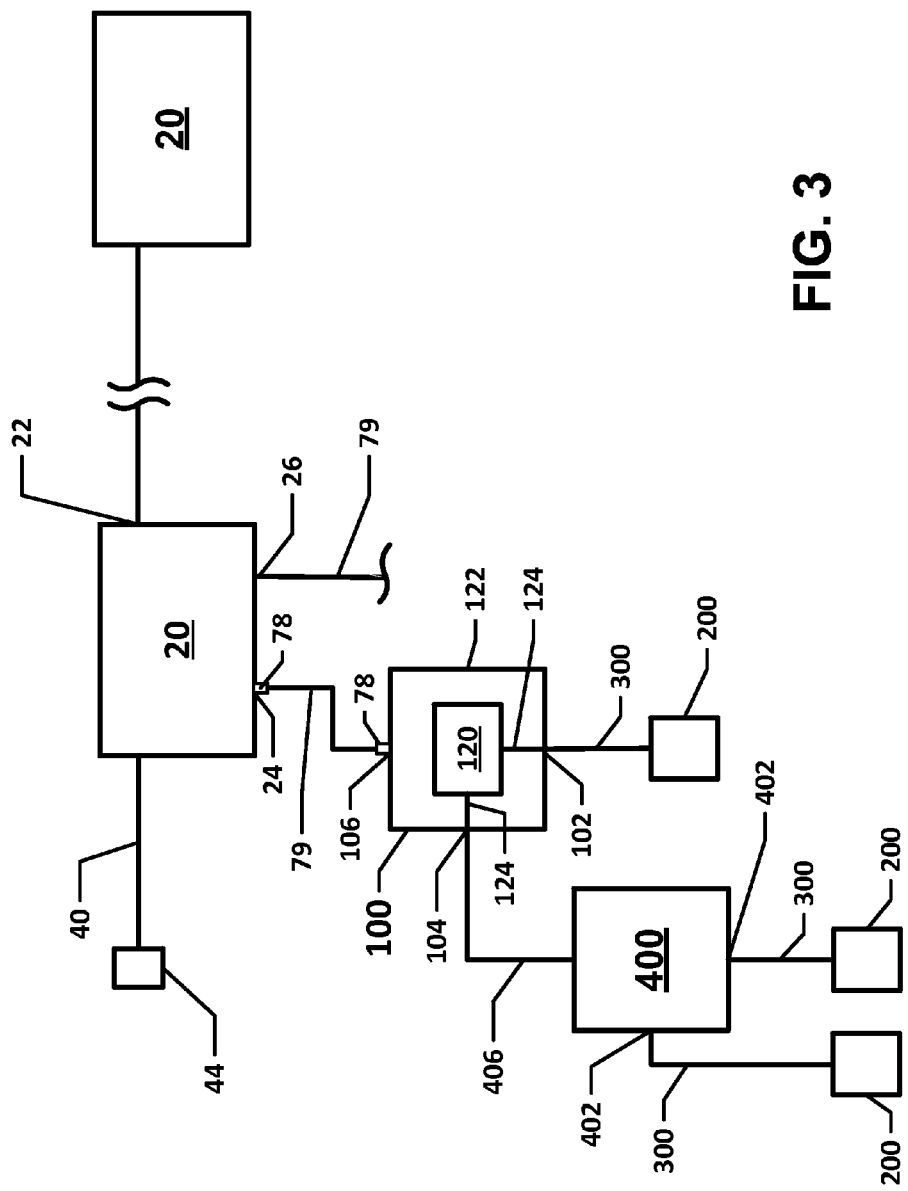
FIG. 3 is a schematic of two indexing terminals as shown in FIG. 2 daisy chained together.

FIG. 3 shows a portion of a fiber optic network having bidirectional indexing architecture. The fiber optic network includes a plurality of the indexing terminals 20 daisy chained together. To daisy chain multiple indexing terminals 20 together, the ruggedized multi-fiber optical connectors 44 of the tethers 40 are coupled with the multi-fiber ruggedized de-mateable connection locations 22 of adjacent indexing terminals 20 to form a string of the indexing terminals 20. The first and second single-fiber ruggedized de-mateable connection locations 24, 26 can be connected to splitter terminals 100 or other structures by cables 79. Cables 79 are depicted as patch cables having ruggedized single-fiber connectors 78 at each end. In one example, the cables 79 can be relatively short in length (e.g., less than 50 feet).

In some implementations, each of the single-fiber ruggedized de-mateable connection locations 24, 26 can receive an optical fiber carrying one of the dropped fiber optic lines A1-A12, B1-B12. In certain examples, the indexing terminal 20 can include an optical splitter 25 that outputs optical signals onto one optical fiber 27 routed to one of the single-fiber ruggedized de-mateable connection locations 24, 26. In some examples, the optical splitter 25 can receive two inputs to provide redundancy in case of a break in one of the fiber lines. For example, the optical splitter 25 can receive one of the dropped fiber optic lines A1-A12 from the first indexing direction 806 and one of the dropped fiber optic lines B1-B12 from the second indexing direction 814 and can output any received optical signal to the optical fiber 27. Accordingly, optical signals can be provided to the optical fiber 27 via either the one of the first lines A1-A12 or the one of the second lines B1-B12. The cable 79 is optically coupled to the optical fiber 27 at the respective single-fiber ruggedized de-mateable connection locations 24, 26.

Each splitter terminal 100 (shown schematically at FIG. 10) can include an optical power splitter 120 (e.g., a passive optical power splitter) that split signals from the cables 79 into a plurality (e.g., four, eight, sixteen, thirty-two, sixty-four, etc.) of output signals. The optical power splitter 120 can be contained within a protective outer housing 122. Outputs 124 of the power splitter 120 can be optically coupled to a plurality of ruggedized de-mateable connection locations on the protective outer housings. The ruggedized de-mateable connection locations coupled to the splitter outputs 124 can include single-fiber ruggedized de-mateable connection locations 102 and multi-fiber ruggedized de-mateable connection locations 104.

One of the connectors 78 of one of the cables 79 can be received at a single-fiber ruggedized de-mateable connection location 106 of the splitting terminals 100. The single-fiber ruggedized de-mateable connection location 106 can include a dust cap 36a having the same indicia as the dust caps 36b of the connectors 78 (e.g., see FIG. 9). The single-fiber ruggedized de-mateable connection location 106 can be optically coupled to the input side of the passive optical power splitter 120. In one example, each of the splitter terminals 100 can include 1×32 passive optical power splitter and can include two twelve fiber multi-fiber ruggedized de-mateable connection locations 104 and eight single-fiber ruggedized de-mateable connection locations 102.

Figure 11:
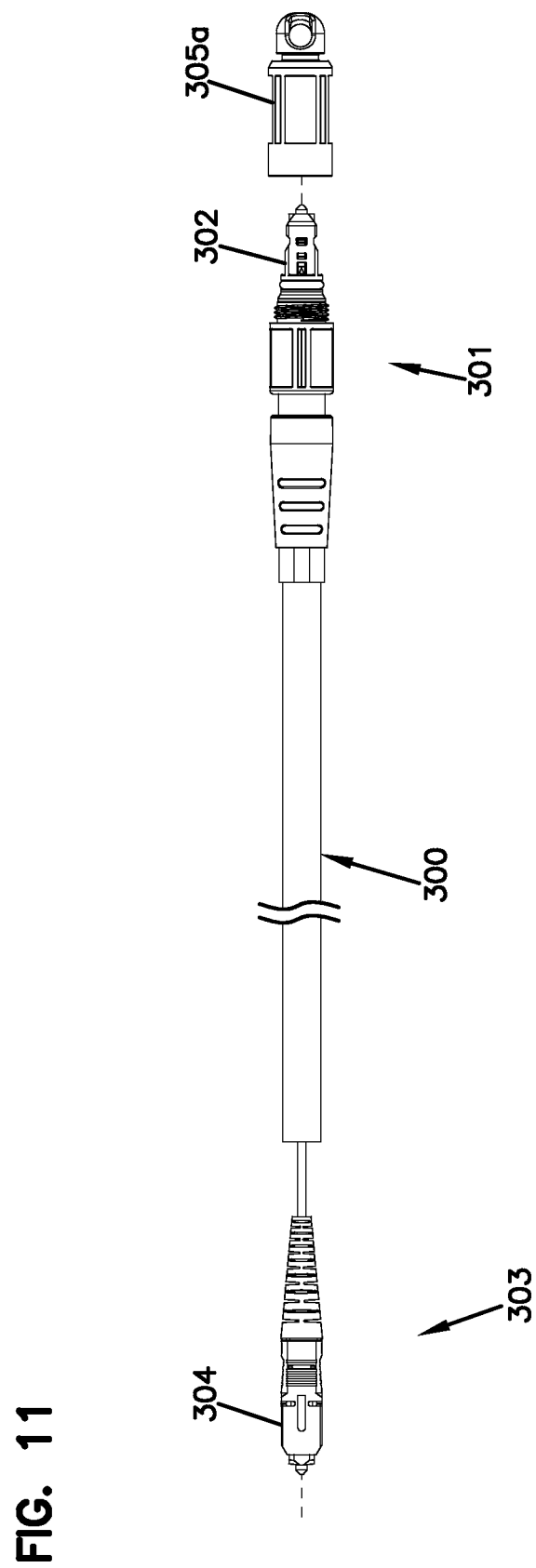
FIG. 11 is a depiction of a universal drop cable that may be incorporated into architectures in accordance with the principles of the present disclosure.

The single-fiber ruggedized de-mateable connection locations 102 can be coupled to subscriber locations 200 by cables 300 (see FIG. 11). The cables 300 can include ruggedized, single fiber connectors 302 at first ends 301 and non-ruggedized, single fiber connectors 304 at the opposite second ends 303. The ruggedized, single fiber connectors 302 at the first ends 301 of the cables 300 can be configured to mate with the single-fiber ruggedized de-mateable connection locations 102 (e.g., see FIG. 10). The ruggedized, single fiber connectors 302 can include dust caps 305a and the single-fiber ruggedized de-mateable connection locations 102 can include dust caps 305b (FIG. 10) having indicia coordinated or matching with the dust caps 305a. The second ends 303 of the cables 300 can be routed into the subscriber premises and the non-ruggedized single fiber connectors 304 can be coupled to optical equipment (e.g, a network interface device) at the subscriber premises. An example cable 300 is disclosed at U.S. Pat. No. 8,224,141 which is hereby incorporated by reference in its entirety.

The multi-fiber ruggedized de-mateable connection locations 104 can be coupled to drop terminals 400 (e.g., see FIG. 12) having a plurality of single-fiber ruggedized de-mateable connection locations 402 each having a dust cap 305b coordinated with the dust caps 305a of the ruggedized, single fiber connectors 302 at the first ends 301 of the cables 300. Each single-fiber ruggedized de-mateable connection location 402 is configured to mate with the ruggedized, single-fiber connector 302 of the cable 300, thereby allowing the cable 300 to be used to couple a selected port of the drop terminal 400 to a subscriber location.

In the example shown in FIG. 12, the drop terminal 400 is mounted to a spool 410. A multi-fiber tether 406 is routed to the drop terminal 400. Optical fibers of the tether 406 are optically coupled to the single-fiber ruggedized de-mateable connection locations 402. The tether 406 is terminated at a free end 405 by a ruggedized, multi-fiber connector 408 adapted to mate with the multi-fiber ruggedized de-mateable connection locations 104. The multi-fiber connector 408 includes a dust cap 409a having indicia that matches indicia of dust caps 409b provided at the multi-fiber ruggedized de-mateable connection locations 104. The tether 406 is wrapped around the spool 410. The spool 410 is coupled to the drop terminal 400. To deploy the tether, the spool 410 and the drop terminal 400 are rotated in unison about an axis of rotation 411 as the tether 406 is paid out from the spool 410. The rotation can be allowed though the use of a bearing arrangement around a mandrel or a Lazy Susan. An example drop terminal configuration of this type is disclosed at U.S. Publication No. 2012/0025005, the disclosure of which is hereby incorporated by reference in its entirety.

Aspects of the present disclosure relate to coding systems that use coded dust caps to facilitate efficiently and effectively deploying a fiber optic network. In certain examples, the dust caps can include identifying indicia such as identifying colors, identifying markings, identifying shapes, identifying letters, identifying symbols, identifying numbers or the like. In certain examples, the identifying indicia can be coordinated between optical components intended to be coupled together so that an installer in the field can readily recognize and identify which components should be coupled together.

For example, the dust caps 32a, 32b have matching indicia (e.g., the same color such as the color green) so that an installer can quickly recognize that the network architecture dictates that the multi-fiber ruggedized connection locations 22 are intended to be couple to the ruggedized multi-fiber optical connectors 44 so as to daisy chain the indexing terminals 20 together. Also, the dust caps 36a, 36b have matching indicia (e.g., the same color such as the color red) so that an installer can quickly recognize that the patch cables 79 terminated with connectors 78 are intended to be coupled between the single-fiber ruggedized de-mateable connection locations 24, 26 and the single-fiber ruggedized connection locations 106 of the splitter terminals 100. Further, the dust caps 409a, 409b have matching indicia (e.g., the same color such as the color blue) so that an installer will quickly recognize that the multi-fiber connectors 408 on the tethers 406 of the drop terminals 400 are intended to mate with the ruggedized multi-fiber de-mateable connection locations 104 of the splitter terminals 100. Moreover, the dust caps 305a, 305b have matching indicia (e.g., the same color such as the color black) so that an installer will quickly recognize that the ruggedized single-fiber connectors 304 of the cables 300 are intended to mate with the single-fiber ruggedized de-mateable connection locations 102 of the splitter terminals 100 or the ruggedized single-fiber de-mateable connection locations 402 of the drop terminal 400.

FIGS. 6-9 further depict one example indexing terminal 20 having a housing 38 with opposite first and second ends 70, 72. The tether 40 interfaces with the housing 38 at the first end 70 and extends outwardly from the first end 70 of the housing 38 in a first direction 74. The multi-fiber ruggedized de-mateable connection location 22, the first single-fiber ruggedized de-mateable connection location 24, and the second single-fiber ruggedized de-mateable connection location 26 are provided at the second end 72 of the housing 38.

Exterior ports of the multi-fiber ruggedized de-mateable connection location 22 faces in a second direction 76 that is diametrically opposite from the first direction 74. In some implementations, the first single-fiber ruggedized de-mateable connection location 24 and the second single-fiber ruggedized de-mateable connection location 26 face at least partially in the second direction 76. In certain examples, the first single-fiber ruggedized de-mateable connection location 24 and the second single-fiber ruggedized de-mateable connection location 26 can be angled relative to the multi-fiber ruggedized de-mateable connection location 22 to face only partially in the second direction.

In the example shown, the housing 38 includes opposite major sides interconnected by a generally cylindrical sidewall. The multi-fiber ruggedized de-mateable connection location 22, the first single-fiber ruggedized de-mateable connection location 24, and the second single-fiber ruggedized de-mateable connection location 26 are provided on the cylindrical sidewall. The tether 40 passes through the cylindrical sidewall.

The multi-fiber ruggedized de-mateable connection location 22 is defined by a ruggedized, multi-fiber adapter configured for receiving a ruggedized multi-fiber optical connector such as the ruggedized multi-fiber optical connector 44 of a like indexing terminal. The exterior port defined by the multi-fiber ruggedized de-mateable connection location 22 defines an interior diameter sized for receiving the ruggedized multi-fiber optical connector 44 of a like indexing terminal 20.

The first and second single-fiber ruggedized de-mateable connection locations 24, 26 can be defined by ruggedized fiber optic adapters. Such ruggedized fiber optic adapters can define internal diameters sized for receiving corresponding ruggedized fiber optic connectors 78 corresponding to cables such as cables 79.

In certain examples of the present disclosure, the dust caps have a ruggedized, environmentally sealed construction. In certain examples, the dust caps are secured to their respective ruggedized connection location by a twist-to-lock interface such as a threaded interface, a bayonet-style interface, or other interface.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. An arrangement of fiber optic network components comprising:
   an indexing terminal including
      a multi-fiber ruggedized de-mateable connection location having a dust cap including a first indicia, a first single-fiber ruggedized de-mateable connection location and a second single-fiber ruggedized de-mateable connection location each including a dust cap having a second indicia, the multi-fiber ruggedized de-mateable connection location including a plurality of fiber positions with one of the fiber positions optically coupled to the first single fiber ruggedized de-mateable connection location; and
      a tether having a first end terminated by a ruggedized multi-fiber optical connector including a dust cap having the first indicia, the ruggedized multi-fiber connector having a plurality of fiber positions, one of the fiber positions being optically coupled to the second single-fiber ruggedized de-mateable connection location, others of the fiber positions of the ruggedized multi-fiber connector being optically coupled to the multi-fiber ruggedized de-mateable connection location by fiber lines, the fiber lines being indexed such that the fiber lines are connected to different fiber positions at the ruggedized multi-fiber connector as compared to at the multi-fiber ruggedized de-mateable connection location; and
   at least one single-fiber cable terminated by a ruggedized single fiber optical connector that is matable with the first and second single-fiber ruggedized de-matable connection locations, the ruggedized single fiber connector including a dust cap having the second indicia.

2. The arrangement of claim 1, wherein the first indicia is a first color and the second indicia is a second color.

3. The arrangement of claim 2, wherein the first color is green and the second color is red.

4. The arrangement of claim 1, wherein the at least one single-fiber cable is a patch cable terminated at a first end by the ruggedized single-fiber connector and at a second end by another ruggedized single-fiber connector, both of the ruggedized single-fiber connectors including the dust caps with the second indicia.

5. The arrangement of claim 4, wherein the ruggedized single-fiber connector at the first end of the single-fiber cable mates with one of the first and second single-fiber ruggedized de-mateable connection locations and the ruggedized single-fiber connector at the second end mates with a single-fiber ruggedized de-mateable connection location of a splitter terminal, the single-fiber ruggedized de-mateable connection location of the splitter terminal having a dust cap with the second indicia.

6. The arrangement of claim 5, wherein the splitter terminal includes a multi-fiber ruggedized de-mateable connection location having a dust cap with a third indicia.

7. The arrangement of claim 6, further comprising a drop terminal having a plurality of single-fiber ruggedized de-mateable connection locations and a tether terminated by a multi-fiber ruggedized connector configured to mate with the multi-fiber ruggedized de-mateable connection location of the splitter terminal, wherein the multi-fiber ruggedized connector of the tether of the drop terminal includes a dust cap having the third indicia.

8. The arrangement of claim 7, wherein the tether of the drop terminal wraps around a spool that is coupled to the drop terminal and rotates in unison with the drop terminal as the tether is paid off from the spool.

9. The arrangement of claim 7, wherein the single-fiber ruggedized de-mateable connection locations of the drop terminal have dust caps with fourth indicia, wherein drop cables are used to connect the single-fiber ruggedized de-mateable connection locations of the drop terminal to subscriber locations, and wherein at least first ends of the drop cables are terminated with single-fiber ruggedized connectors suitable for mating with the single-fiber ruggedized de-mateable connection locations of the drop terminal, the single-fiber ruggedized connectors of the drop cables including dust caps with the fourth indicia.

10. The arrangement of claim 9, wherein the drop cables include second ends terminated with non-ruggedized, single fiber connectors.

11. The arrangement of claim 9, wherein the splitter terminal includes a plurality of single-fiber ruggedized de-mateable connection locations having dust caps with the fourth indicia, and wherein the drop cables are used to connect the single-fiber ruggedized de-mateable connection locations of the splitter terminal to subscriber locations.

12. A fiber optic network comprising:
   first and second optical components to be optically coupled together, the first and second optical components including first and second de-mateable connection locations having dust caps with first coordinated indicia; and
   third and fourth optical components to be optically coupled together, the third and fourth optical components including first and second de-mateable connection locations having dust caps with second coordinated indicia; and
   the first, second, third and fourth components cooperating to form at least a portion of the fiber optic network, and the first coordinated indicia being different from the second coordinated indicia.

13. The fiber optic network of claim 12, wherein the dust caps have twist-to-lock interfaces.

14. The fiber optic network of claim 13, wherein the dust caps are environmentally sealed.

15. The fiber optic network of claim 12, wherein the first coordinated indicia includes a first matching color, and the second coordinated indicia includes a second matching color.

16. The fiber optic network of claim 12, wherein the first and second de-mateable connection locations are ruggedized, single-fiber de-mateable connection locations, and wherein the third and fourth de-mateable connection locations are ruggedized, multi-fiber de-mateable connection locations.

17. An arrangement of fiber optic network components comprising:
   an indexing terminal including:
      an enclosure;
      a first optical splitter disposed within the enclosure;
      a multi-fiber ruggedized de-mateable connection location including a plurality of fiber positions with one of the fiber positions optically coupled to a first input of the optical splitter; and a single-fiber ruggedized de-mateable connection location receiving an output of the first optical splitter; and a tether having a first end terminated by a ruggedized multi-fiber optical connector, the ruggedized multi-fiber connector having a plurality of fiber positions, one of the fiber positions being optically coupled to a second input of the first optical splitter, others of the fiber positions of the ruggedized multi-fiber connector being optically coupled to the multi-fiber ruggedized de-mateable connection location by fiber lines, the fiber lines being indexed such that the fiber lines are connected to different fiber positions at the ruggedized multi-fiber connector as compared to at the multi-fiber ruggedized de-mateable connection location.

18. The arrangement of claim 17, further comprising:

at least one single-fiber cable terminated by a ruggedized single fiber optical connector that is matable with the single-fiber ruggedized de-matable connection location; and a splitter terminal including a second optical splitter, the second optical splitter having an input that receives the at least one single-fiber cable, the second optical splitter outputting split optical signals.

19. The arrangement of claim 18, wherein the second optical splitter includes a passive optical power splitter.

20. The arrangement of claim 18, wherein the second optical splitter includes a 1×32 optical splitter.

21. A fiber optic terminal comprising:

a terminal housing that is environmentally sealed and that defines at least first and second ruggedized ports for interfacing with ruggedized fiber optic connectors, the first and second ruggedized ports being accessible from outside the terminal housing, the first and second ruggedized ports being respectively closed by first and second dust caps, the first and second dust caps being respectively sealed relative to the first and second ruggedized ports, the first and second dust caps being respectively secured at the first and second ruggedized ports by twist-to-lock interfaces, and the first dust cap having a first indicia and the second dust cap having a second indicial different from the first indicia.

22. The terminal of claim 21, wherein the first indicia is a first color and the second indicia is a second color.

23. The terminal of claim 21, wherein the terminal is an indexing terminal and wherein optical fibers terminated at multi-fiber connectors are indexed at least partially within the terminal housing.

* * * * *